2 Sheets—Sheet 1.

A. CHRYSTAL & J. J. WALSH.
Centrifugal Drying-Machine.

No. 211,971. Patented Feb. 4, 1879

Attest:
Chas. H. Searle
W. N. Wood

Alexander Chrystal
John J. Walsh
Inventors
By North Osgood
Attorney.

N. PETERS, PHOTO-LITHOGRAPHER, WASHINGTON, D. C.

2 Sheets—Sheet 2.

A. CHRYSTAL & J. J. WALSH.
Centrifugal Drying-Machine.

No. 211,971. Patented Feb. 4, 1879.

Attest:
Chas. H. Searle
W. N. Wood

Alexander Chrystal
John J. Walsh,
Inventors:
By North Osgood
Attorney.

UNITED STATES PATENT OFFICE.

ALEXANDER CHRYSTAL, OF WEST TROY, AND JOHN J. WALSH, OF TROY, ASSIGNORS OF ONE-THIRD THEIR RIGHT TO EDWARD CAREY, OF TROY, NEW YORK.

IMPROVEMENT IN CENTRIFUGAL DRYING-MACHINES.

Specification forming part of Letters Patent No. 211,971, dated February 4, 1879; application filed December 26, 1878.

*To all whom it may concern:*

Be it known that we, ALEXANDER CHRYSTAL and JOHN J. WALSH, respectively of West Troy, county of Albany, and Troy, county of Rensselaer, in the State of New York, have jointly invented certain new and useful Improvements in Centrifugal Drying-Machines, of which the following is a full, clear, and exact description, reference being had to the accompanying drawings, and to the letters of reference marked thereon.

Figure 1:
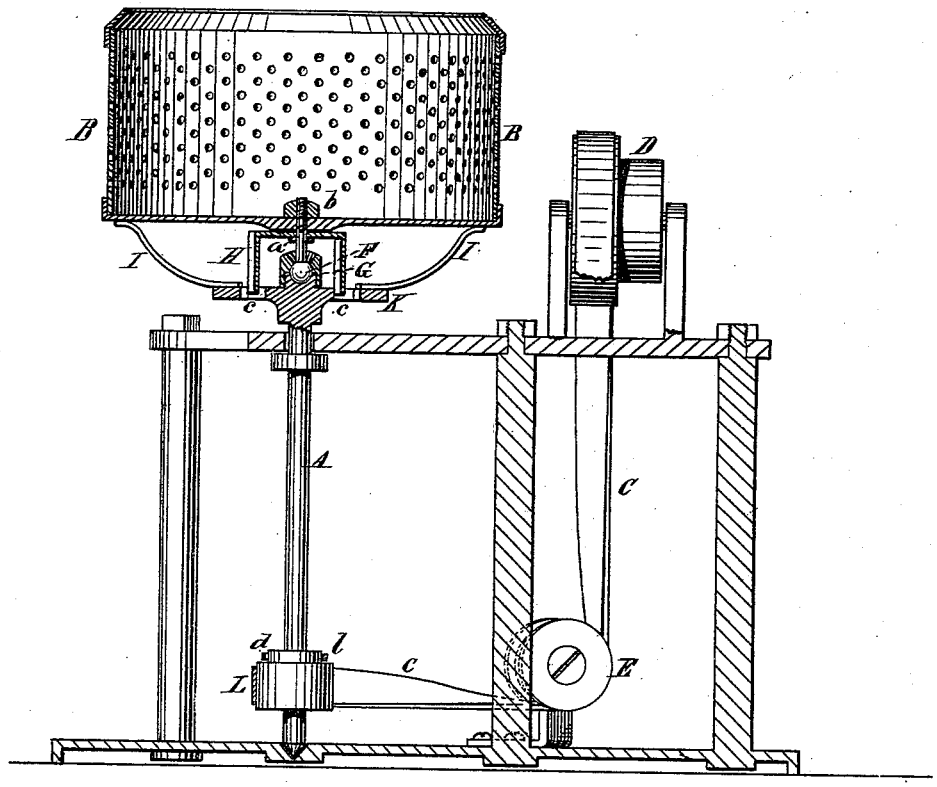
Figure 2:
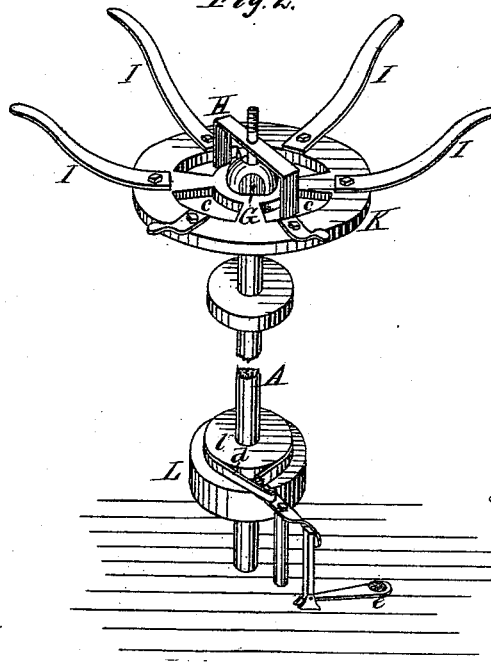
Figure 3:
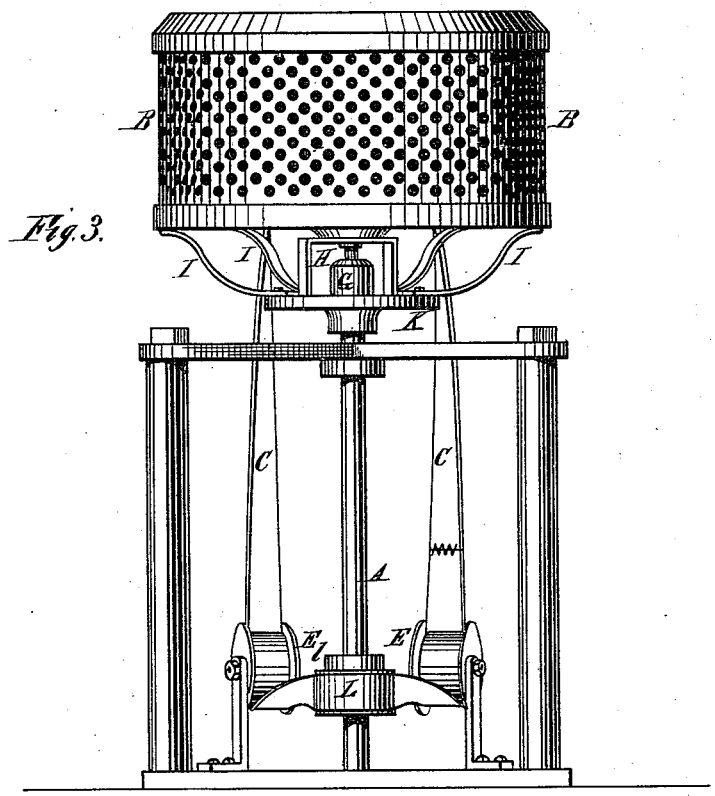
Figure 4:
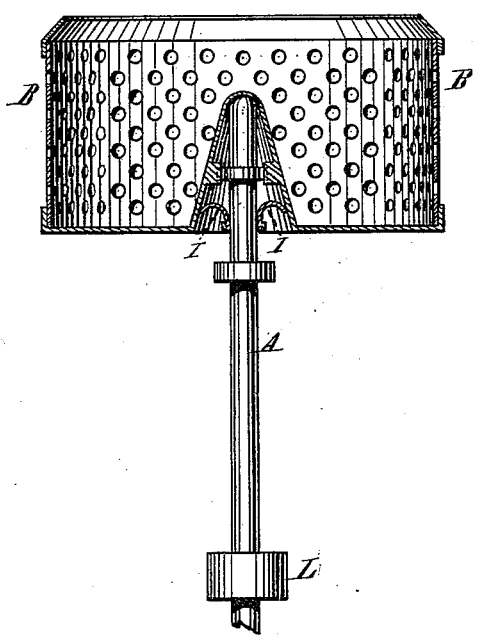

Figure 1 is an axial section of our improved machine; Fig. 2, a perspective view with the basket removed. Fig. 3 is an end elevation or front view, and Fig. 4 represents a modified arrangement of the essential features.

Like letters in all the figures indicate corresponding parts.

The object of our invention is to improve the present forms of centrifugal drying-machines, commonly known as "whizzers," so that they shall be capable of being run at a higher rate of speed than they ordinarily are run, require the expenditure of less power, run smoothly and without the jarring motion usually attending their employment, and so that the cost of construction shall be reduced as well as the liability to get out of order, while the efficiency of the machine is in no way impaired, but rather augmented.

To accomplish all of this the invention consists, essentially, in uniting the whirling cage or basket with the vertical driving-shaft by means of a loose joint, and supporting the basket upon suitable springs.

It further consists in certain peculiarities of construction and arrangements or combinations of parts, as will be hereinafter first fully described, and then pointed out in the claims.

A is the driving-shaft, which supports the cage or basket B, and to which a rapid rotary motion is communicated by any suitable mechanical means, which, for the sake of illustration, may be presumed to be the belt C, driven by pulley D, a change of direction being afforded by the idle-wheels E E. The driving attachment is, however, no portion of the present invention, since it may obviously be modified to correspond with any source and location of the driving-power.

The basket B is coupled to shaft A by the ball-and-socket joint F G, the cap G of which is made removable, and so formed as to permit a considerable lateral movement in the shank of ball F. The bottom of the basket is firmly clamped upon the spider H, which latter part rests upon the ledge *a*, and it is apparent that the basket, the spider, and the ball F must move together when the clamping-nut *b* is firmly screwed down.

K is a horizontal plate, firmly keyed to shaft A, and provided with openings *c c*, which receive the depending legs of spider H. The slots *c c* are sufficiently large to permit the easy movement of the spider-legs, so that the basket may tip downwardly toward any point of its circumference.

Suitable springs I I radiate outwardly and upwardly from plate K, their free ends serving as an elastic bearing for the perimeter of the basket. When the load is being placed in the machine, the joint F G permits the basket to bear down upon one side or the other, according to the disposition of the weight of material, thus enabling the operator to balance the load as evenly as convenient or necessary. But however the weight of the load may be distributed, it will, when the machine is speeded, cause the bottom of the basket to run in a horizontal plane, and while the basket is assuming this position the springs relieve the shaft from undue strain and tend to steady the load, thereby obviating the wabbling motion common to other styles of machines, from which motion so much jarring ordinarily results. By thus steadying the basket the machine is made to perform its offices without unnecessary wear upon the journals and bearings, and its frame-work may be made lighter and cheaper in consequence.

The driving-shaft and its connections with the basket being located beneath the bottom thereof leaves the mouth of the basket unobstructed and free to receive the material to be dried.

For the proper control of the machine, as well as to provide means for arresting the basket as soon as the driving-power is uncoupled, we propose to employ an ordinary brake. This might be most conveniently applied near the driving-pulley L, and may be made in the form of a band, as at d, which embraces wheel l, and which may be contracted thereon by pressing down upon foot-lever e after the ordinary manner of operating similar brakes.

It is intended, of course, to surround the basket with a casing adapted to catch and confine the spray thrown out through the perforated walls B, and this casing is provided with a drip-pipe to carry off the water. These features it has not been deemed necessary to illustrate, inasmuch as they are adjuncts of nearly all centrifugal driers, and are very well understood.

The machine described is intended mainly for drying cloth, as in laundries and like establishments; but it is apparent that the principles embodied in its construction are applicable to all manner of centrifugal driers independently of the material to be operated upon.

In Fig. 4 the cage B is shown as supported upon the extremity of shaft A, and caused to revolve therewith by means of any suitable connection which permits the tipping of the basket or cage, as before explained. Under this arrangement the springs I I are introduced between the pocket and the shaft in a manner clearly indicated, in which position they perform similar functions as in the previously-illustrated construction.

When constructed and arranged in accordance with the foregoing principles, the machine is found to be light-running, economical of driving-power, and otherwise to admirably answer the several objects of the invention, as previously stated.

Having thus fully described our invention, we desire it understood that we do not claim the perforated revolving cage, nor the mere application of a ball-and-socket joint to such cage; but

What we do claim as new, and desire to secure by Letters Patent, is—

1. In a centrifugal drying-machine, the combination of the basket and supporting-springs, the basket being connected with the driving-shaft and mounted thereon, substantially in the manner shown and described.

2. In a centrifugal drying-machine, the combination, with the basket, of the ball-and-socket joint, the connecting-spider, and the supporting-springs, the several parts being arranged and combined substantially as shown and described.

In testimony that we claim the foregoing we have hereunto set our hands in the presence of two witnesses.

ALEX. CHRYSTAL.
JOHN J. WALSH.

Witnesses:
JAS. W. KENNA,
JOSEPH TAYLOR.